(12) United States Patent
Chiang et al.

(10) Patent No.: US 11,221,654 B2
(45) Date of Patent: Jan. 11, 2022

(54) ELECTRONIC DEVICE

(71) Applicants: Jen-Yu Chiang, Taipei (TW);
Wang-Hung Yeh, Taipei (TW);
Hsin-Chieh Fang, Taipei (TW);
Shu-Hsien Chu, Taipei (TW)

(72) Inventors: Jen-Yu Chiang, Taipei (TW);
Wang-Hung Yeh, Taipei (TW);
Hsin-Chieh Fang, Taipei (TW);
Shu-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/835,344

(22) Filed: Mar. 31, 2020

(65) Prior Publication Data
US 2020/0310498 A1    Oct. 1, 2020

Related U.S. Application Data

(60) Provisional application No. 62/827,798, filed on Apr. 1, 2019.

(51) Int. Cl.
*G06F 1/16*        (2006.01)
*E05D 3/18*       (2006.01)

(52) U.S. Cl.
CPC ............. *G06F 1/1681* (2013.01); *E05D 3/18* (2013.01); *G06F 1/1616* (2013.01); *G06F 1/1637* (2013.01); *G06F 1/1684* (2013.01); *E05Y 2201/636* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,706,167 A | * | 1/1998 | Lee ..................... | G06F 1/1664 361/679.55 |
| 5,717,431 A | * | 2/1998 | Chia-Ying ............ | G06F 1/1616 345/168 |
| 5,734,548 A | * | 3/1998 | Park ..................... | G06F 1/1616 361/679.14 |
| 5,742,475 A | * | 4/1998 | Riddiford ............. | G06F 1/1616 16/291 |
| 5,754,395 A | * | 5/1998 | Hsu ...................... | G06F 1/1616 361/679.11 |

(Continued)

*Primary Examiner* — Lisa Lea-Edmonds
(74) *Attorney, Agent, or Firm* — JCIPRNET

(57) ABSTRACT

An electronic device includes a first body, a second body, a hinge assembly, and a linkage assembly. The first body has a first pivoting end. The second body includes first and second casings slidably disposed on each other. The first casing has a second pivoting end. The hinge assembly has a first axial portion, a second axial portion, and a connection portion. The first and second pivoting ends are pivotally connected to the first axial portion and the second axial portion, respectively. The connection portion does not overlap the second axial portion along an axial direction. The linkage assembly is connected between the connection portion and the second casing. When the hinge assembly rotates along the second axial portion relative to the first casing to drive the first body to be unfolded, the linkage assembly drives the second casing to slide, so that an end of the second casing protrudes.

15 Claims, 12 Drawing Sheets

(56) References Cited

U.S. PATENT DOCUMENTS

| | | | | |
|---|---|---|---|---|
| 5,818,360 A | * | 10/1998 | Chu | G06F 1/1616 341/22 |
| 6,028,768 A | * | 2/2000 | Cipolla | G06F 1/1616 361/679.12 |
| 6,078,495 A | * | 6/2000 | Cipolla | G06F 1/203 361/679.46 |
| 6,304,431 B1 | * | 10/2001 | Kim | G06F 1/1656 361/679.09 |
| 6,816,365 B2 | * | 11/2004 | Hill | G06F 1/1616 341/22 |
| 6,870,730 B2 | * | 3/2005 | Riddiford | G06F 1/1616 248/917 |
| 6,912,121 B2 | * | 6/2005 | Karidis | G06F 1/1616 248/455 |
| 7,355,843 B2 | * | 4/2008 | Riddiford | G06F 1/1616 345/905 |
| 7,630,195 B2 | * | 12/2009 | Lin | G06F 1/203 361/679.26 |
| 7,719,826 B1 | * | 5/2010 | Chang | G06F 1/1656 361/679.17 |
| 7,907,393 B2 | * | 3/2011 | Sellers | G06F 1/1681 361/679.27 |
| 8,050,017 B2 | * | 11/2011 | Riddiford | G06F 1/1616 361/679.02 |
| 8,544,808 B2 | * | 10/2013 | Saad | G06F 1/1616 248/346.06 |
| 9,354,666 B2 | * | 5/2016 | Chen | G06F 1/162 |
| 9,389,646 B2 | * | 7/2016 | Oakley | G06F 1/1618 |
| 2004/0145862 A1 | * | 7/2004 | Hill | G06F 1/1667 361/679.44 |
| 2008/0174569 A1 | * | 7/2008 | Riddiford | G06F 1/1616 345/173 |

* cited by examiner

ELECTRONIC DEVICE

CROSS-REFERENCE TO RELATED APPLICATION

This application claims the priority benefit of U.S. provisional application Ser. No. 62/827,798, filed on Apr. 1, 2019. The entirety of the above-mentioned patent application is hereby incorporated by reference herein and made a part of this specification.

TECHNICAL FIELD

The disclosure relates to an electronic device, and in particular to an electronic device whose bodies may be relatively unfolded and folded.

DESCRIPTION OF RELATED ART

Portable electronic devices, such as notebook computers, tablet computers, and smart phones, have been popular in the consumer market for a long time. The notebook computer, for instance, includes a host and a display that are pivotally connected to each other. The display may be folded to the host for portability or easy storage, and the display may be unfolded from the host to allow a user to operate the host and watch the display. With the development of functions of the notebook computer and requirements for heat dissipation, some function assemblies (such as a microphone, a speaker, an antenna, etc.) and a heat dissipation openings are disposed on the host. However, due to the limitation of configuration space, the function assemblies and heat dissipation openings are often covered by the casings of the notebook computer, which reduces the performance of the notebook computer. On the other hand, the lower portion of the display is usually equipped with a wider side frame to provide space for traces or electrical assemblies. However, the wide side frame cannot visually comply with the design trend of slim side frames of the existing electronic devices.

SUMMARY

The disclosure provides an electronic device, which allows a function assembly and a heat dissipation opening to have good performance and may visually comply with the design trend of slim side frames.

The electronic device provided in an embodiment of the disclosure includes a first body, a second body, a hinge assembly, and a linkage assembly. The first body has a first pivoting end. The second body includes a first casing and a second casing that are slidably disposed on each other, and the first casing has a second pivoting end. The hinge assembly has a first axial portion, a second axial portion, and a connection portion. The first pivoting end is pivotally connected to the first axial portion, the second pivoting end is pivotally connected to the second axial portion, and the connection portion does not overlap the second axial portion in an axial direction of the second axial portion. The linkage assembly is connected between the connection portion and the second casing. When the hinge assembly rotates relative to the first casing along the second axial portion to drive the first body to be unfolded from a folded state to an unfolded state relative to the second body, the linkage assembly drives the second casing to slide relative to the first casing, so that an end of the second casing protrudes relative to the first casing.

In an embodiment of the disclosure, the electronic device includes at least one function assembly disposed at the end.

In an embodiment of the disclosure, above function assembly includes at least one of a microphone, a speaker, and an antenna.

In an embodiment of the disclosure, the second casing has at least one heat dissipation opening at the end.

In an embodiment of the disclosure, the first body has a display surface and a side frame. The side frame is located between the display surface and the first pivoting end. As the second pivoting end ascends relative to the first pivoting end, a region of the side frame covered by the second body gradually increases.

In an embodiment of the disclosure, the first body in the unfolded state is adapted to rotate relative to the hinge assembly along the first axial portion and flip to a back surface of the second body.

In an embodiment of the disclosure, an axial direction of the first axial portion and the axial direction of the second axial portion are parallel to each other.

In an embodiment of the disclosure, the linkage assembly is pivotally connected to the connection portion along a rotation axis, and the rotation axis is parallel to the axial direction of the second axial portion.

In an embodiment of the disclosure, the linkage assembly includes a first linkage rod and a second linkage rod. One end of the first linkage rod is pivotally connected to the connection portion, the other end of the first linkage rod is movably connected to one end of the second linkage rod, and the other end of the second linkage rod is movably connected to the second casing.

In an embodiment of the disclosure, the connection portion is a pillar, the first linkage rod has an axial hole, and the pillar passes through the axial hole.

In an embodiment of the disclosure, the second linkage rod has an open slot, the second casing has a pillar, and the pillar passes through the open slot.

In an embodiment of the disclosure, the first linkage rod has a ball joint slot, the second linkage rod has a ball joint head, and the ball joint slot and the ball joint head are connected in a ball joint manner.

In an embodiment of the disclosure, a first extension axis passes through the axial direction of the first axial portion and the second axial portion and is perpendicular to the axial direction of the second axial portion, a second extension axis passes through the connection portion and the second axial portion and is perpendicular to the axial direction of the second axial portion, and an angle between the first extension axis and the second extension axis is within a range from 60 degrees to 80 degrees.

In an embodiment of the disclosure, the electronic device includes a rotation axis, wherein the second pivoting end is connected to the rotation axis and is pivotally connected to the second axial portion through the rotation axis, the rotation axis has a receding notch, and a portion of the linkage mechanism is located in the receding notch.

In an embodiment of the disclosure, when the first body is unfolded relative to the second body from the folded state to the unfolded state, the second pivoting end ascends relative to the first pivoting end.

Based on the above, in addition to the first axial portion and the second axial portion that are pivotally connected to the first body and the second body, the hinge assembly provided in one or more embodiments of the disclosure is additionally equipped with the connection portion. Since the connection portion does not overlap the second axial portion in the axial direction of the second axial portion, when the hinge assembly rotates relative to the first casing of the second body along the second axial portion, the position of the connection portion shifts relative to the first casing, so that the connection portion drives through the linkage assembly the second casing of the second body to slide relative to the first casing, whereby the end of the second casing protrudes to expose the function assembly and/or the heat dissipation opening at the end. Accordingly, the performance of the function assembly and/or the heat dissipation opening may be enhanced. On the other hand, the first pivoting end of the first body and the second pivoting end of the second body are not coaxial but are pivotally connected to the first axial portion and the second axial portion of the hinge assembly, respectively. Hence, when the hinge assembly rotates relative to the second body along the second axial portion, the position of the first axial portion descends relative to the second body, which enables the second pivoting end of the second body to ascend relative to the first pivoting end of the first body, so that the region of the side frame of the first body covered by the second body during the operation gradually increases. As a result, the design trend of slim side frames may be visually satisfied.

DESCRIPTION OF THE EMBODIMENTS

Figure 1:
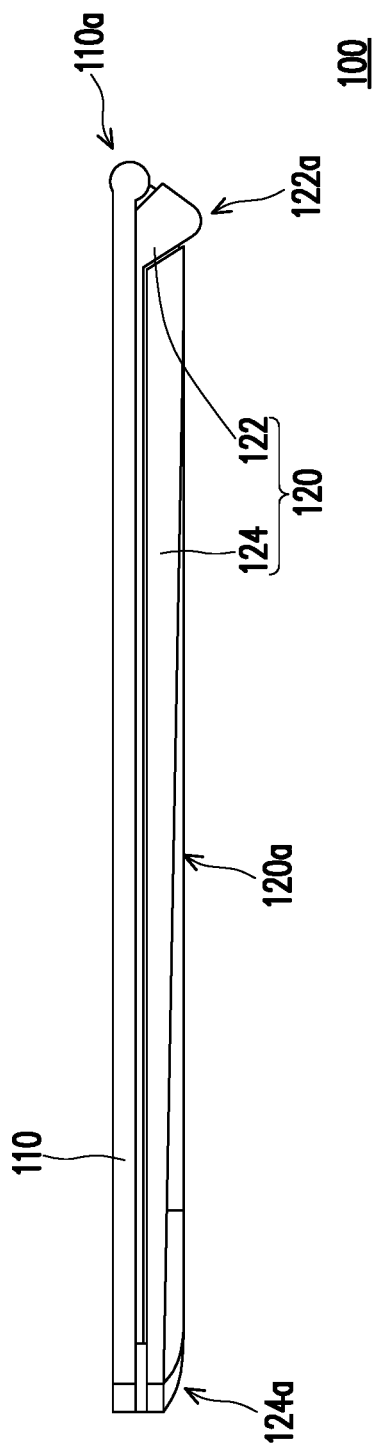
FIG. 1 is a side view illustrating an electronic device according to an embodiment of the disclosure.
Figure 2:
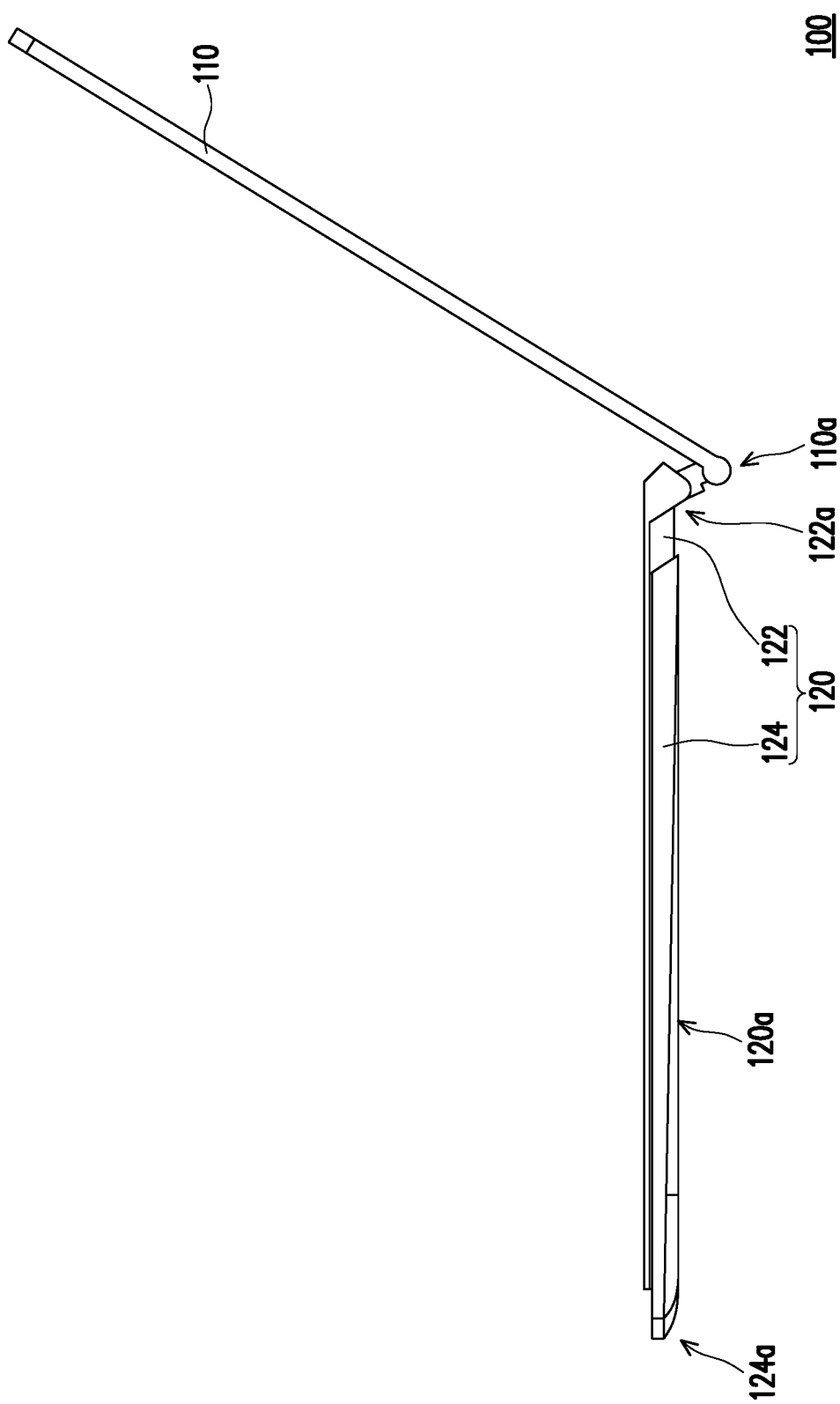
FIG. 2 illustrates that the first body depicted in FIG. 1 is unfolded relative to the second body.
Figure 3:
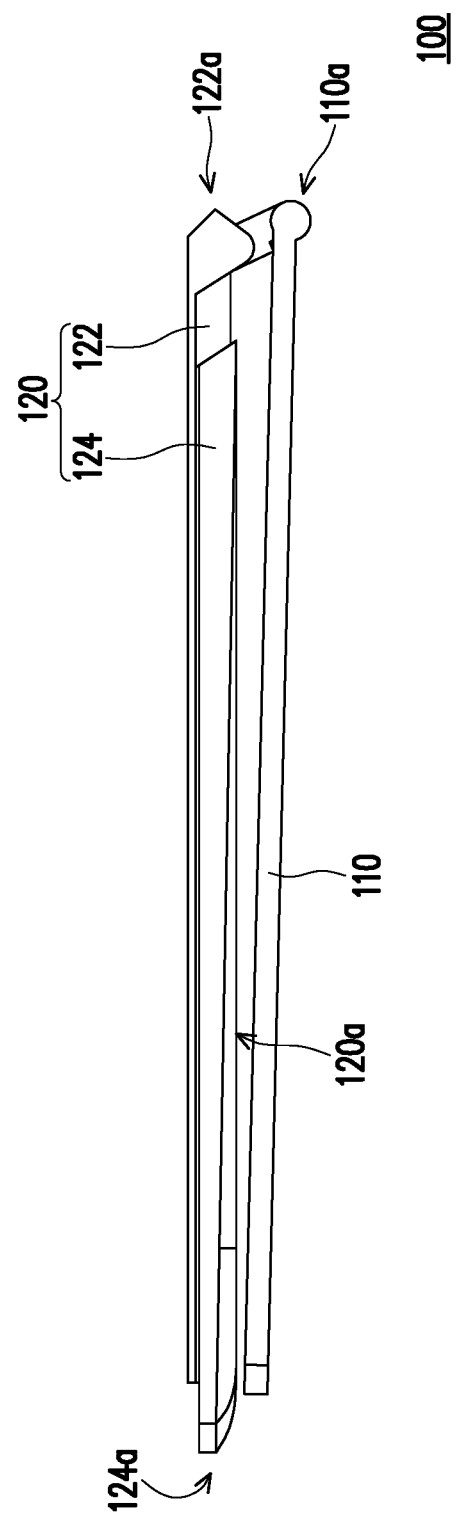
FIG. 3 illustrates that the first body depicted in FIG. 2 flips to the back surface of the second body.

FIG. 1 is a side view illustrating an electronic device according to an embodiment of the disclosure. FIG. 2 illustrates that the first body depicted in FIG. 1 is unfolded relative to the second body. FIG. 3 illustrates that the first body depicted in FIG. 2 flips to the back surface of the second body. With reference to FIG. 1 to FIG. 3, an electronic device 100 provided in the embodiment is, for instance, a notebook computer and includes a first body 110 and a second body 120. The first body 110 is, for instance, a display of the notebook computer, and the second body 120 is, for instance, a host of the notebook computer. The first body 110 may be folded to the second body 120 as shown in FIG. 1, so that the electronic device may be easily stored or carried. The first body 110 may be unfolded relative to the second body 120 as shown in FIG. 2, so that a user may easily operate the second body 120 and view a display image of the first body 110. In addition, the first body 110 may be flipped to a back surface 120a of the second body 120 as shown in FIG. 3, so that the electronic device 100 is changed to be in an operating mode of a tablet computer.

Figure 4:
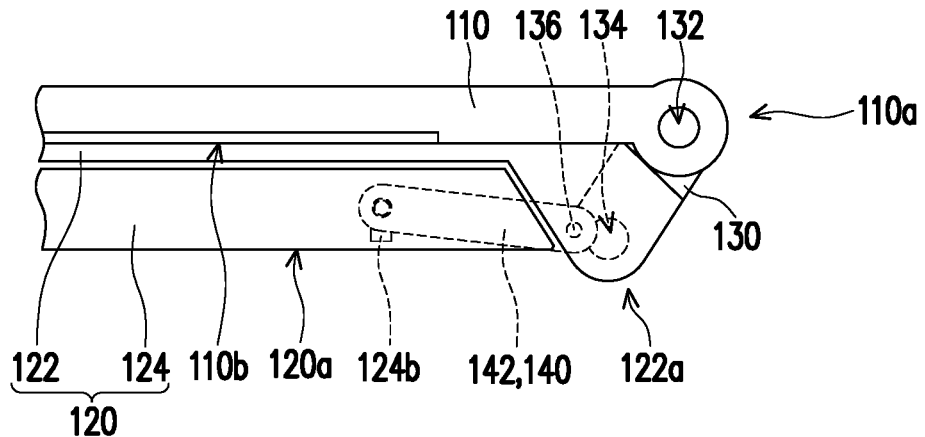
FIG. 4 is a partial side view illustrating the electronic device depicted in FIG. 1.
Figure 5:
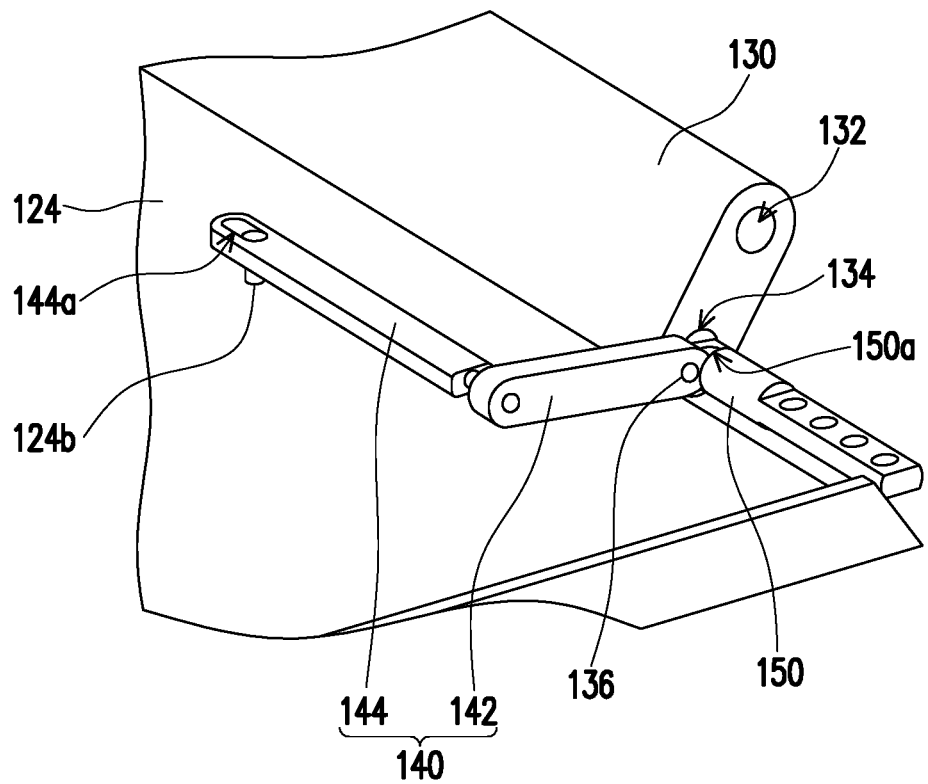
FIG. 5 is a perspective view illustrating some components of the electronic device depicted in FIG. 1.
Figure 6:
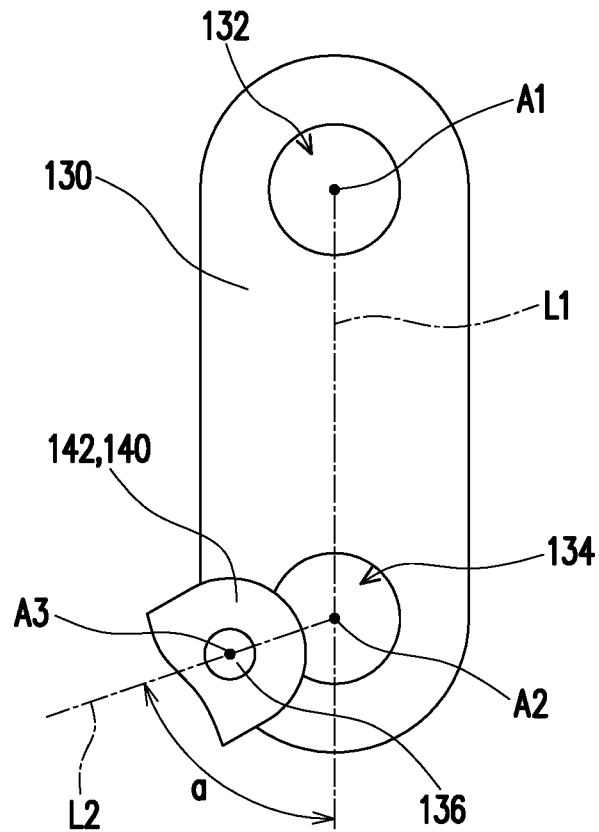
FIG. 6 is a schematic view illustrating some components of the electronic device depicted in FIG. 4.

FIG. 4 is a partial side view illustrating the electronic device depicted in FIG. 1. FIG. 5 is a perspective view illustrating some components of the electronic device depicted in FIG. 1. FIG. 6 is a schematic view illustrating some components of the electronic device depicted in FIG. 4. With reference to FIG. 4 to FIG. 6, the electronic device 100 provided in the embodiment further includes a hinge assembly 130 and a linkage assembly 140. The first body 110 has a first pivoting end 110a. The second body 120 includes a first casing 122 and a second casing 124 that are slidably disposed on each other. The first casing 122 has a second pivoting end 122a. The hinge assembly 130 has a first axial portion 132, a second axial portion 134, and a connection portion 136. The first pivoting end 110a of the first body 110 is pivotally connected to the first axial portion 132 of the hinge assembly 130, and the second pivoting end 122 of the second body 120 is pivotally connected to the second axial portion 134 of the hinge assembly 130. An axial direction A1 (shown in FIG. 6) of the first axial portion 132 and an axial direction A2 (shown in FIG. 6) of the second axial portion 134 are parallel to each other. The linkage assembly 140 is connected between the connection portion 136 and the second casing 124, and the connection portion 136 does not overlap the second axial portion 134 in the axial direction A2 of the second axial portion 134.

Figure 7:
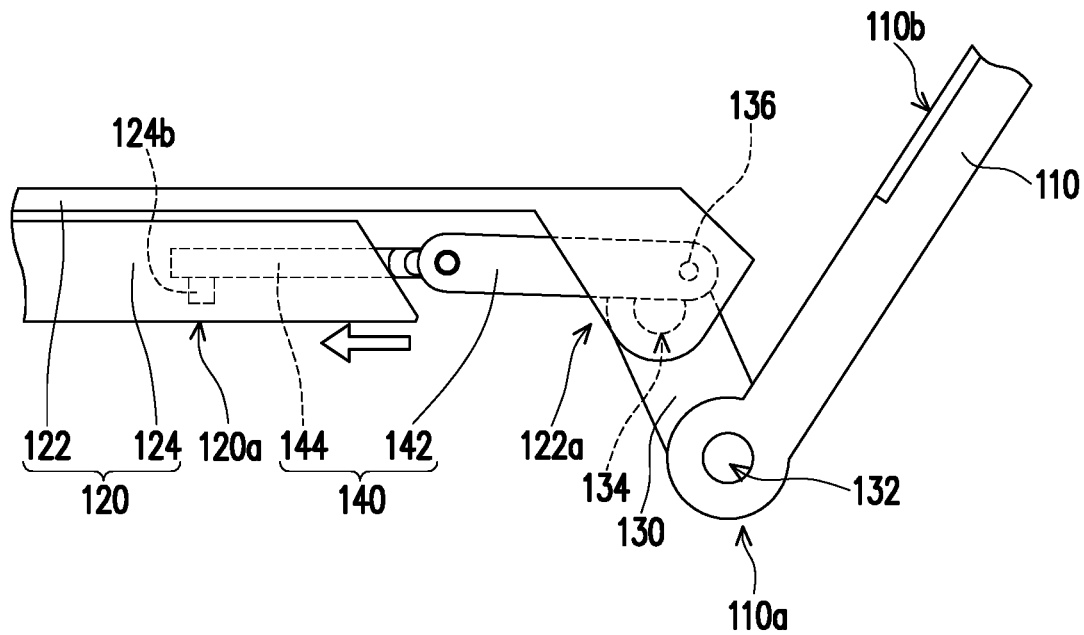
FIG. 7 illustrates that the first body depicted in FIG. 4 is unfolded relative to the second body.

FIG. 7 illustrates that the first body depicted in FIG. 4 is unfolded relative to the second body. Since the connection portion 136 does not overlap the second axial portion 134 in the axial direction A2 of the second axial portion 134 as described above, when the hinge assembly 130 rotates relative to the first casing 122 along the second axial portion 134 to drive the first body 110 to be unfolded from a folded state shown in FIG. 4 to an unfolded state shown in FIG. 7 relative to the second body 120, the position of the connection portion 136 is shifted relative to the first casing 122, so that the connection portion 136 drives the second casing 124 to slide relative to the first casing 122 through the linkage assembly 140, and thereby an end 124a of the second casing 124 protrudes relative to the first casing 122 as shown in FIG. 2 to expose a function assembly and/or a heat dissipation opening at the end 124a. As such, the performance of the function assembly and/or the heat dissipation opening may be improved.

Figure 8:
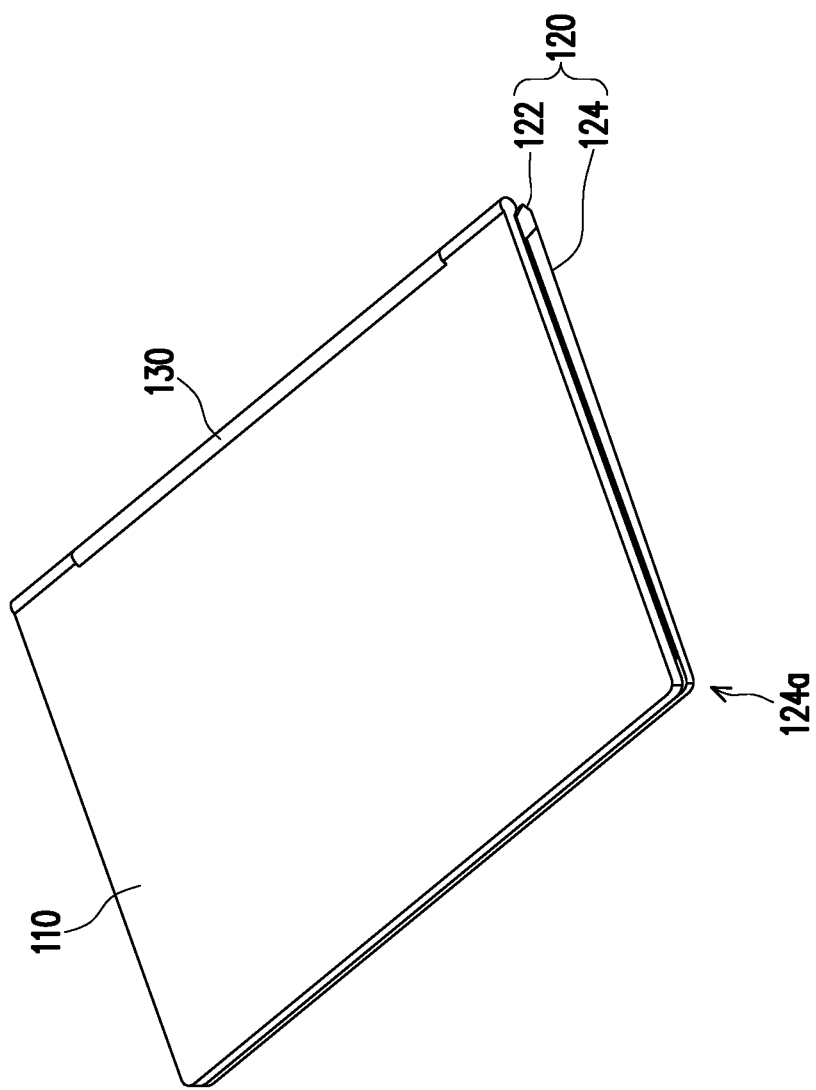
FIG. 8 is a perspective view illustrating the electronic device depicted in FIG. 1.
Figure 9:
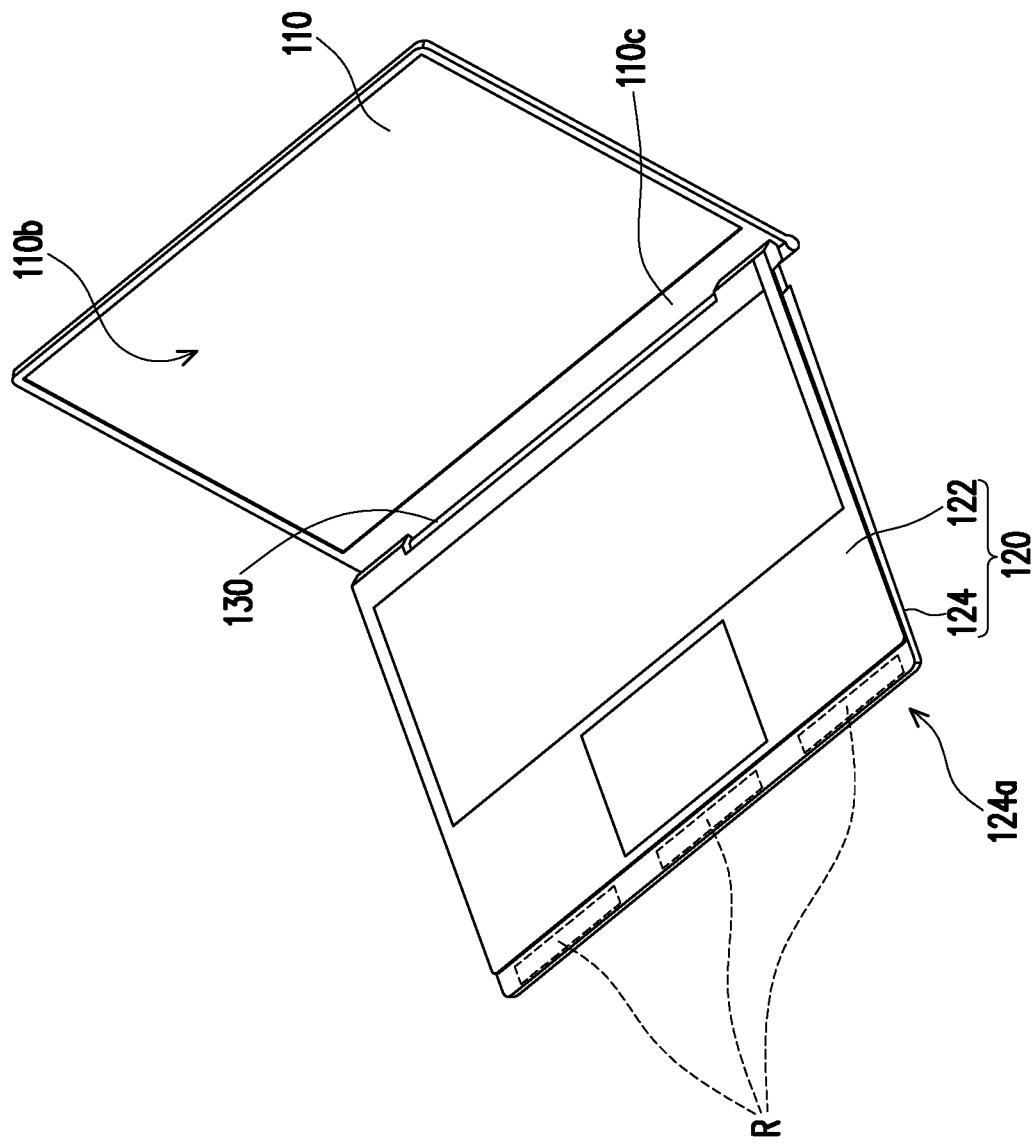
FIG. 9 is a perspective view illustrating the electronic device depicted in FIG. 2.

FIG. 8 is a perspective view illustrating the electronic device depicted in FIG. 1. FIG. 9 is a perspective view illustrating the electronic device depicted in FIG. 2. Specifically, when the first body 110 is not unfolded, the end 124a of the second casing 124 does not protrude as shown in FIG. 1 and FIG. 8. When the first body 110 is unfolded, the end 124a of the second casing 124 protrudes as shown in FIG. 2 and FIG. 9, and in FIG. 9 each region R at the end 124a schematically represents the exposed function assembly and/or the exposed heat dissipation opening. The function assembly may be a microphone, a speaker, an antenna, or the like, which should not be construed as a limitation in the disclosure.

As shown in FIG. 6, a first extension axis L1 passes through the first axial portion 132 and the second axial portion 134 and is perpendicular to the axial direction A2 of the second axial portion 134, and a second extension axis L2 passes through the connection portion 136 and the second axial portion 134 and is perpendicular to the axial direction A2 of the second axial portion 134. An angle a between the first extension axis L2 and the second extension axis L2 is, for instance, within a range from 60 degrees and 80 degrees, so that the connection portion 136 is, together with the rotation of the hinge assembly 130, shifted to an appropriate position relative to the first casing 122 to drive the linkage assembly 140 to be actuated.

Figure 10:
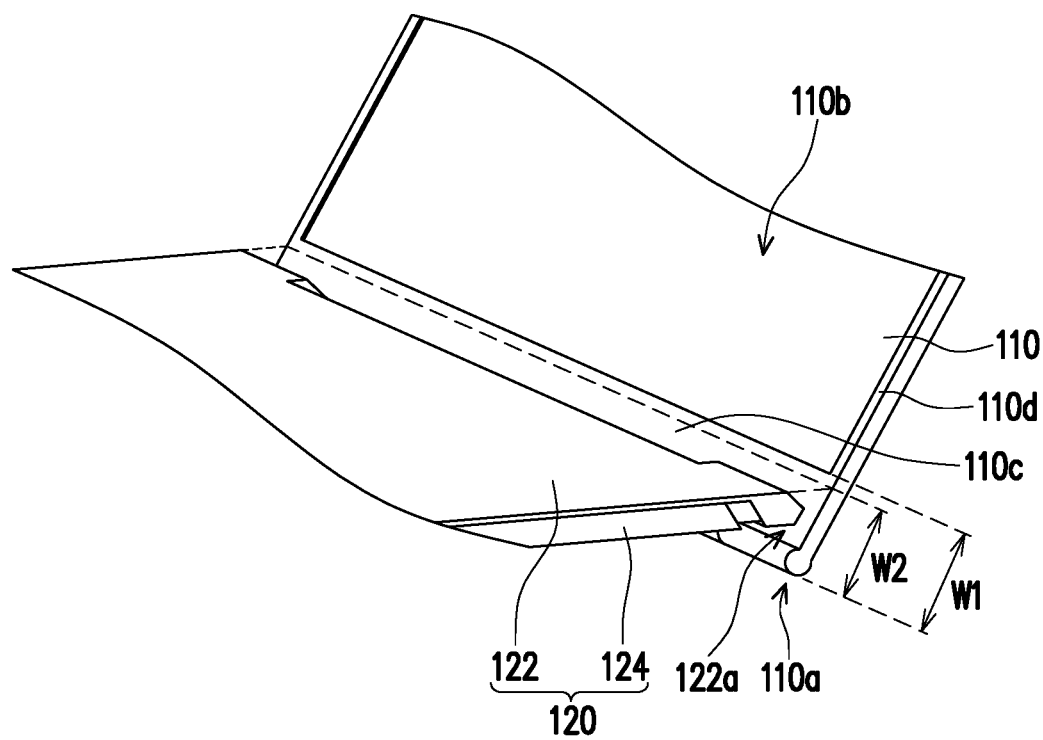
FIG. 10 is a partial enlarged view illustrating the electronic device depicted in FIG. 9.

FIG. 10 is a partial enlarged view illustrating the electronic device depicted in FIG. 9. On the other hand, as shown in FIG. 9 and FIG. 10, the first body 110 has a display surface 110b and a side frame 110c that is located between the display surface 110b and the first pivoting end 110a. The first pivoting end 110a of the first body 110 and the second pivoting end 122a of the second body 120 are not coaxially arranged but are pivotally connected to the first axial portion 132 and the second axial portion 134 of the hinge assembly 130 as shown in FIG. 4; therefore, when the hinge assembly 130 rotates along the second axial portion 134 from the state shown in FIG. 1 and FIG. 4 to the state shown in FIG. 2 and FIG. 7 relative to the second body 120, the position of the first axial portion 132 descends relative to the second body 120, so that the second pivoting end 122a of the second body 120 ascends relative to the first pivoting end 110a of the first body 110, whereby a region of the side frame 110c covered by the second body 120 gradually increases during the actuation process to visually comply with the design trend of slim side frames. More specifically, a total width of the side frame 110c is W1 (shown in FIG. 10), and a width of the region of the side frame 110c covered by the second body 120 as shown in FIG. 10 is W2 (shown in FIG. 10). The width W2 is, for instance, within a range from 90% to 100% of the width W1, and a difference between the width W1 and the width W2 is approximately equal to a width of the remaining side frames of the first body 110 (such as a side frame 110d shown in FIG. 10), for instance.

Figure 11:
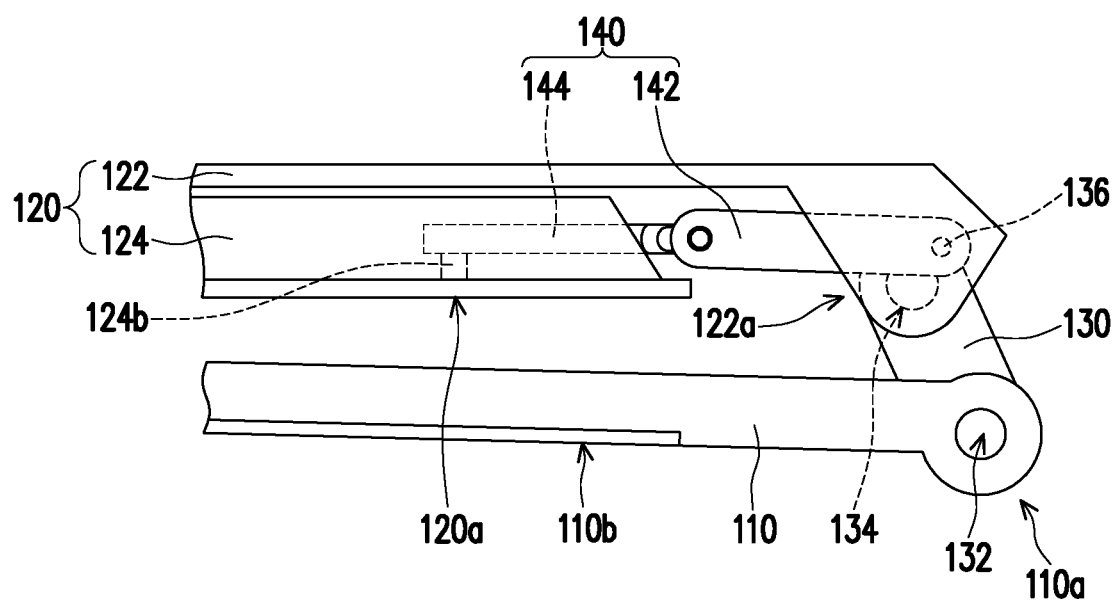
FIG. 11 illustrates the first body depicted in FIG. 7 flips to the back surface of the second body.

FIG. 11 illustrates the first body depicted in FIG. 7 flips to the back surface of the second body. The first body 110 in the unfolded state shown in FIG. 7 is adapted to rotate along the first axial portion 132 relative to the hinge assembly 130, so as to flip to the back surface 120a of the second body 120 as shown in FIG. 11, which also depicts the operating mode of the tablet computer in FIG. 3. In the actuation process, the connection portion 136 does not shift relative to the first casing 122, so the end 124a of the second casing 124 in the state shown in FIG. 3 still protrudes relative to the first casing 122 to expose the function assembly and/or the heat dissipation opening.

Figure 12:
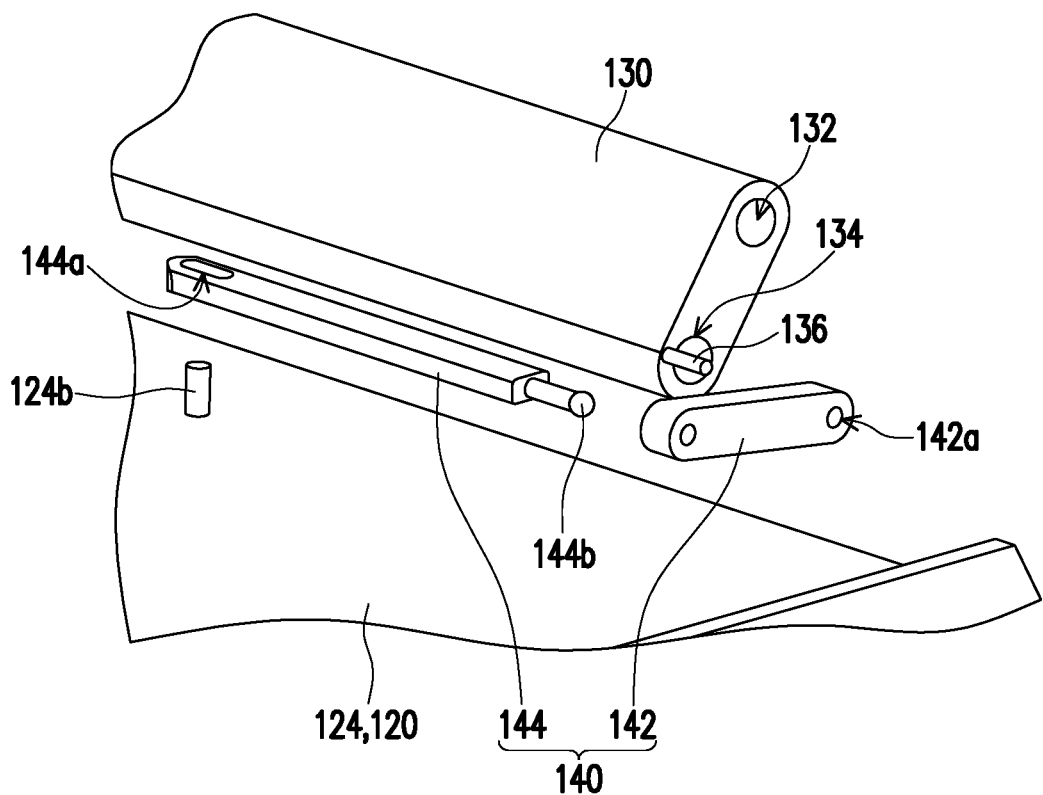
FIG. 12 is an exploded view illustrating some components of the electronic device depicted in FIG. 5.
Figure 13:
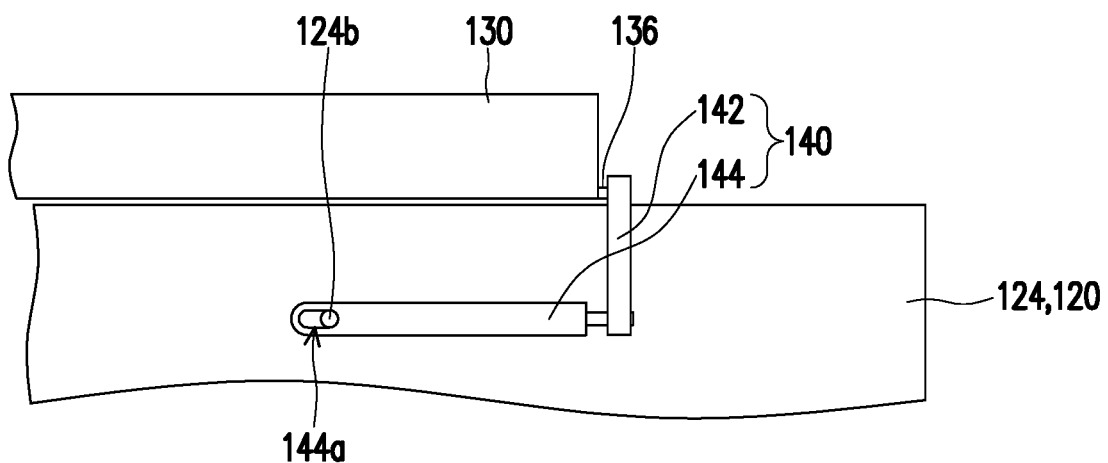
FIG. 13 is a top view illustrating some components of the electronic device depicted in FIG. 5.
Figure 14:
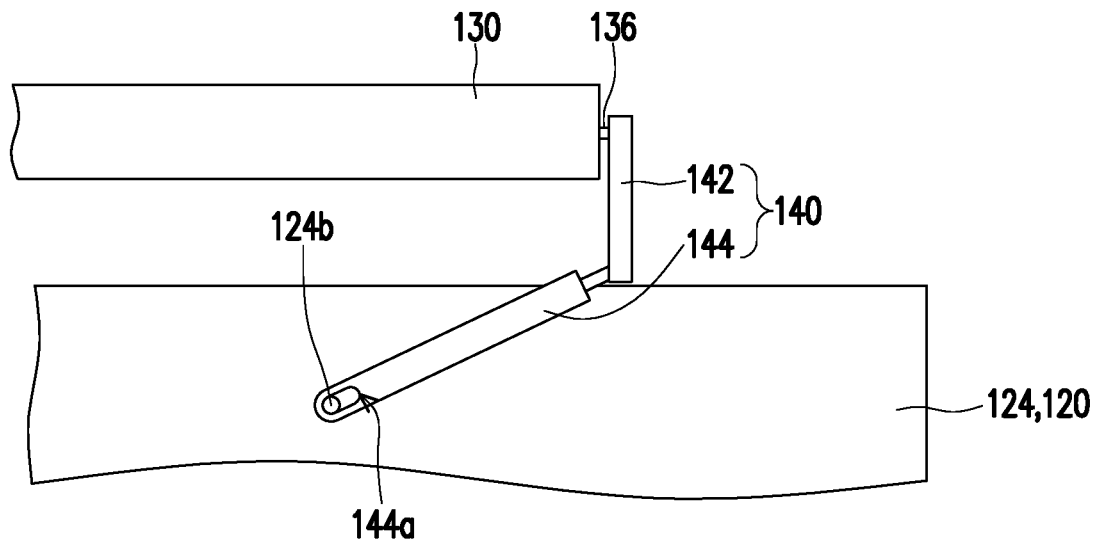
FIG. 14 illustrates actuation of the linkage assembly depicted in FIG. 13.
Figure 15:
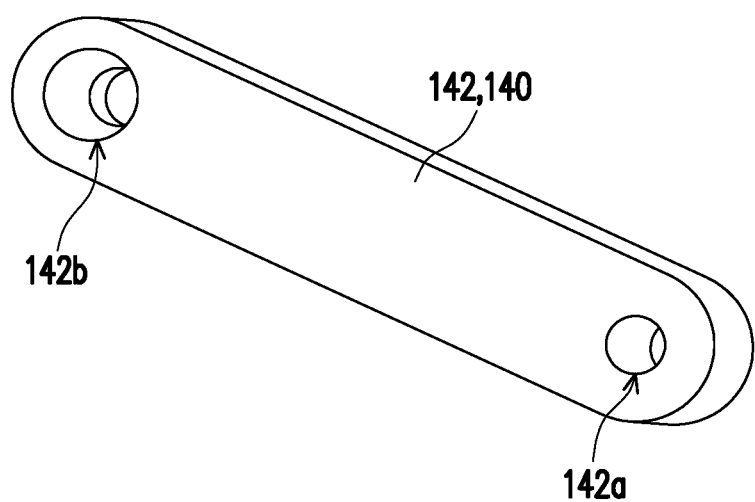
FIG. 15 is a perspective view illustrating the first linkage rod depicted in FIG. 12 at another view angle.

FIG. 12 is an exploded view illustrating some components of the electronic device depicted in FIG. 5. FIG. 13 is a top view illustrating some components of the electronic device depicted in FIG. 5. FIG. 14 illustrates actuation of the linkage assembly depicted in FIG. 13. With reference to FIG. 12 to FIG. 14, in the embodiment, the linkage assembly 140 includes a first linkage rod 142 and a second linkage rod 144, one end of the first linkage rod 142 is pivotally connected to the connection portion 136 along a rotation axis A3 parallel to the axial direction A2 of the second axial portion 134, the other end of the first linkage rod 142 is movably connected to one end of the second linkage rod 144, and the other end of the second linkage rod 144 is movably connected to the second casing 124. Specifically, the connection portion 136 is, for instance, a pillar, and the first linkage rod 142 may have an axial hole 142a (shown in FIG. 12), and the pillar passes through the axial hole 142a. In addition, the second linkage rod 144 may have an open slot 144a, and the second casing 124 may have a pillar 124b. The pillar 124b passes through the open slot 144a. FIG. 15 is a perspective view illustrating the first linkage rod depicted in FIG. 12 at another view angle. With reference to FIG. 12 and FIG. 15, the first linkage rod 142 may have a ball joint slot 142b, the second linkage rod 144 may have a ball joint head 144b, and the ball joint slot 142b and the ball joint head 144b are connected in a ball joint manner. In other embodiments, the connection portion 136, the first linkage rod 142, the second linkage rod 144, and the second casing 124 may be connected to each other through other types of structures, and the disclosure is not limited thereto.

Figure 16:
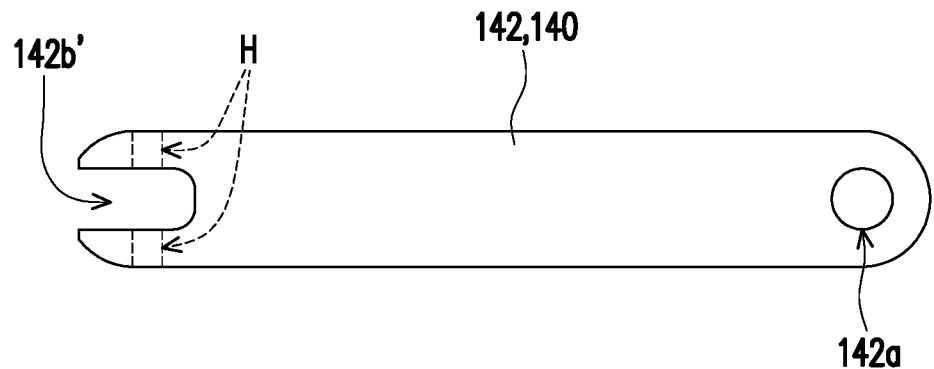
FIG. 16 is a front view illustrating a first linkage rod according to another embodiment of the disclosure.
Figure 17:
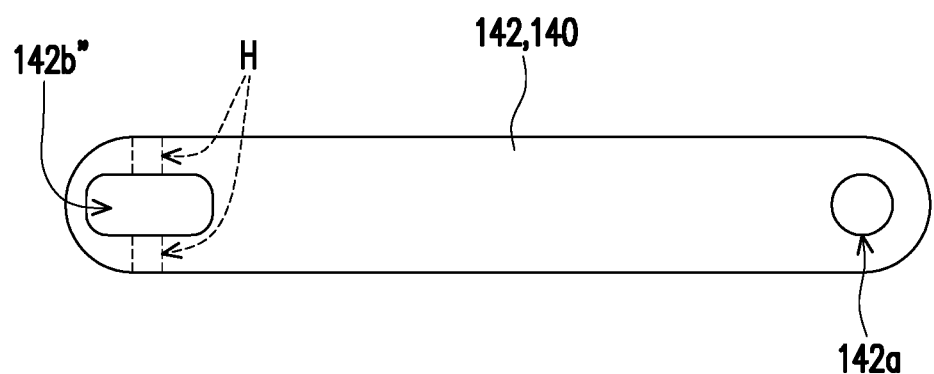
FIG. 17 is a front view illustrating a first linkage rod according to another embodiment of the disclosure.

FIG. 16 is a front view illustrating a first linkage rod according to another embodiment of the disclosure. The difference between the embodiment shown in FIG. 16 and the embodiment shown in FIG. 15 lies in that the first linkage rod 142 depicted in FIG. 16 replaces the ball joint slot 142b depicted in FIG. 15 with a U-shaped notch 142b', and the U-shaped notch 142b' has a axial hole H respectively on its two opposite sides. One end of the second linkage rod 144 may be pivotally connected to the axial hole H within the U-shaped notch 142b', and a width of the U-shaped notch 142b' may be slightly larger than a width of one end of the second linkage rod 144, so that the one end of the second linkage rod 144 may slightly sway in the U-shaped notch 142b' to have sufficient freedom of actuation. FIG. 17 is a front view illustrating a first linkage rod according to another embodiment of the disclosure. The difference between the embodiment shown in FIG. 17 and the embodiment shown in FIG. 16 lies in that the first linkage rod 142 depicted in FIG. 17 replaces the U-shaped notch 142b' depicted in FIG. 16 with an arc bottom cave 142b''.

Figure 18:
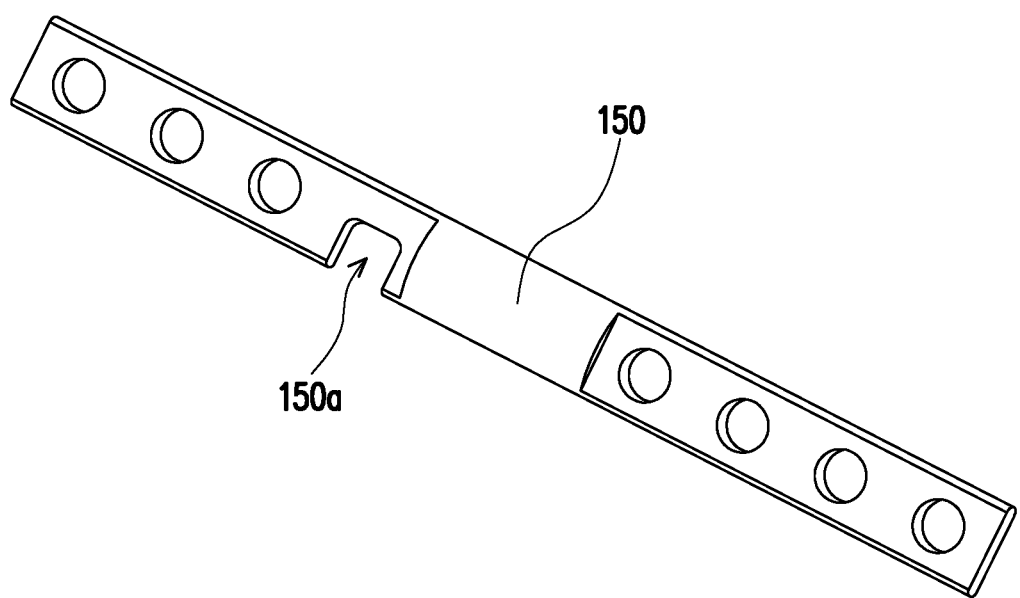
FIG. 18 is a perspective view illustrating the rotation axis depicted in FIG. 5.

FIG. 18 is a perspective view illustrating the rotation axis depicted in FIG. 5. With reference to FIG. 5 and FIG. 18, the electronic device 100 provided in the embodiment further includes a rotation axis 150, and the second pivoting end 122a of the second body 120 (shown in FIG. 4) is connected to the rotation axis 150 and is pivotally connected to the second axial portion 134 of the hinge assembly 130 through the rotation axis 150. The rotation axis 150 has a receding notch 150a, and a portion of the linkage mechanism 140 (one end of the first linkage rod 142) is located within the receding notch 150a to avoid structural interference between the linkage mechanism 140 and the rotation axis 150. The first pivoting end 110a of the first body 110 may be pivotally connected to the first axial portion 132 of the hinge assembly 130 in a similar manner through another rotation axis, which will not be repeated hereinafter.

To sum up, in addition to the first axial portion and the second axial portion which are pivotally connected to the first body and the second body, the hinge assembly provided in one or more embodiments of the disclosure is additionally equipped with the connection portion. Since the connection portion does not overlap the second axial portion in the axial direction of the second axial portion, when the hinge assembly rotates relative to the first casing of the second body along the second axial portion, the position of the connection portion shifts relative to the first casing, so that the connection portion drives through the linkage assembly the second casing of the second body to slide relative to the first casing, whereby the end of the second casing protrudes to expose the function assembly and/or the heat dissipation opening at the end. Accordingly, the performance of the function assembly and/or the heat dissipation opening may be enhanced. On the other hand, the first pivoting end of the first body and the second pivoting end of the second body are not coaxial but are pivotally connected to the first axial portion and the second axial portion of the hinge assembly, respectively. Hence, when the hinge assembly rotates relative to the second body along the second axial portion, the position of the first axial portion descends relative to the second body, which enables the second pivoting end of the second body to ascend relative to the first pivoting end of the first body, so that the region of the side frame of the first body covered by the second body during the operation gradually increases. As a result, the design trend of slim side frames may be visually satisfied.

What is claimed is:

1. An electronic device, comprising:
a first body, having a first pivoting end;
a second body, comprising a first casing and a second casing slidably disposed on each other, wherein the first casing has a second pivoting end;
a hinge assembly, having a main body, a first axial portion directly connected to the main body, a second axial portion directly connected to the main body, and a connection portion directly connected to the main body, wherein the first pivoting end is pivotally connected to the first axial portion, the second pivoting end is pivotally connected to the second axial portion, and the connection portion does not overlap the second axial portion in an axial direction of the second axial portion; and
a linkage assembly, connected between the connection portion and the second casing, wherein when the hinge assembly rotates relative to the first casing along the second axial portion to drive the first body to be unfolded from a folded state to an unfolded state relative to the second body, the linkage assembly drives the second casing to slide relative to the first casing, so that an end of the second casing protrudes relative to the first casing.

2. The electronic device according to claim 1, comprising at least one function assembly, wherein the at least one function assembly is disposed at the end.

3. The electronic device according to claim 2, wherein the at least one function assembly comprises at least one of a microphone, a speaker, and an antenna.

4. The electronic device according to claim 1, wherein the second casing has at least one heat dissipation opening at the end.

5. The electronic device according to claim 1, wherein the first body has a display surface and a side frame, the side frame is located between the display surface and the first pivoting end, and a region of the side frame covered by the second body gradually increases as the second pivoting end ascends relative to the first pivoting end.

6. The electronic device according to claim 1, wherein the first body in the unfolded state is adapted to rotate relative to the hinge assembly along the first axial portion and flip to a back surface of the second body.

7. The electronic device according to claim 1, wherein an axial direction of the first axial portion and the axial direction of the second axial portion are parallel to each other.

8. The electronic device according to claim 1, wherein the linkage assembly is pivotally connected to the connection portion along a rotation axis, and the rotation axis is parallel to the axial direction of the second axial portion.

9. The electronic device according to claim 1, wherein the linkage assembly comprises a first linkage rod and a second linkage rod, one end of the first linkage rod is pivotally connected to the connection portion, the other end of the first linkage rod is movably connected to one end of the second linkage rod, and the other end of the second linkage rod is movably connected to the second casing.

10. The electronic device according to claim 9, wherein the connection portion is a pillar, the first linkage rod has an axial hole, and the pillar passes through the axial hole.

11. The electronic device according to claim 9, wherein the second linkage rod has an open slot, the second casing has a pillar, and the pillar passes through the open slot.

12. The electronic device according to claim 9, wherein the first linkage rod has a ball joint slot, the second linkage rod has a ball joint head, and the ball joint slot and the ball joint head are connected in a ball joint manner.

13. The electronic device according to claim 1, wherein a first extension axis passes through the first axial portion and the second axial portion and is perpendicular to the axial direction of the second axial portion, a second extension axis passes through the connection portion and the second axial portion and is perpendicular to the axial direction of the second axial portion, and an angle between the first extension axis and the second extension axis is within a range from 60 degrees to 80 degrees.

14. The electronic device according to claim 1, comprising a rotation axis, wherein the second pivoting end is connected to the rotation axis and is pivotally connected to the second axial portion through the rotation axis, the rotation axis has a receding notch, and a portion of the linkage mechanism is located in the receding notch.

15. The electronic device according to claim 1, wherein when the first body is unfolded from the folded state to the unfolded state relative to the second body, the second pivoting end ascends relative to the first pivoting end.

* * * * *